Aug. 6, 1957　　　J. W. TWEEDY ET AL　　　2,802,123
STATOR CONSTRUCTION FOR A CAPACITOR MOTOR OR THE LIKE
Filed March 22, 1955　　　　　　　　　　　　2 Sheets-Sheet 2
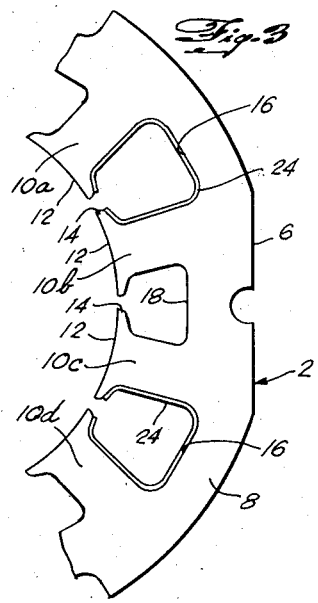
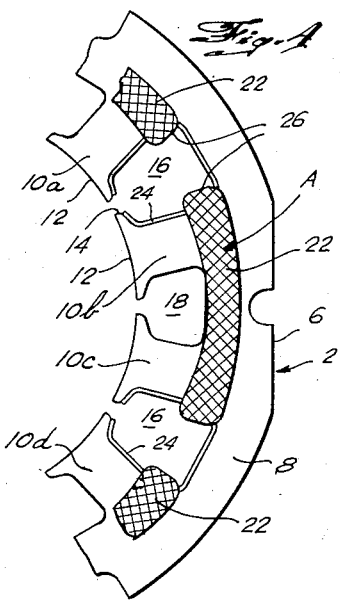
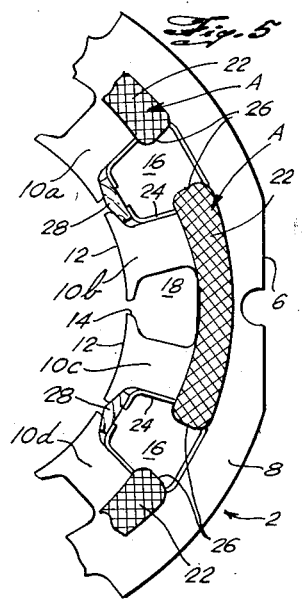
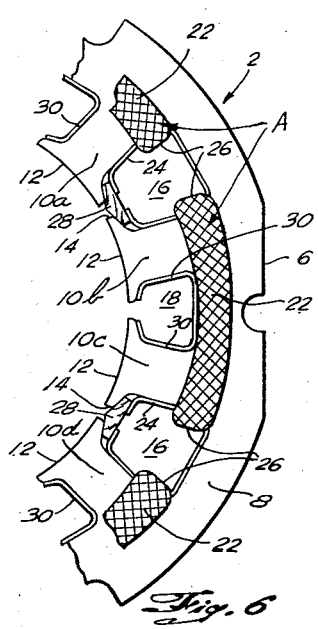
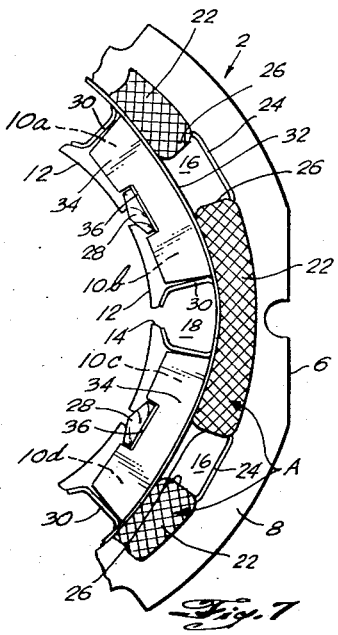
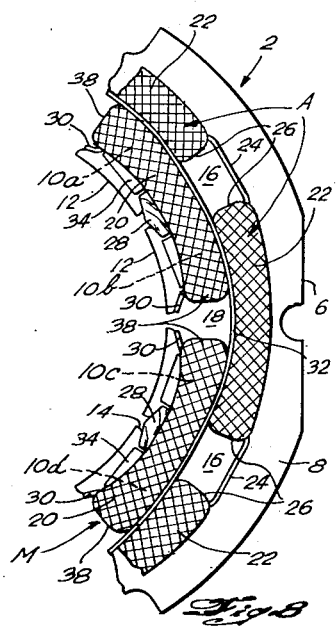
INVENTORS.
JAMES W. TWEEDY
THOMAS GINTHER
BY James and Franklin
ATTORNEYS.

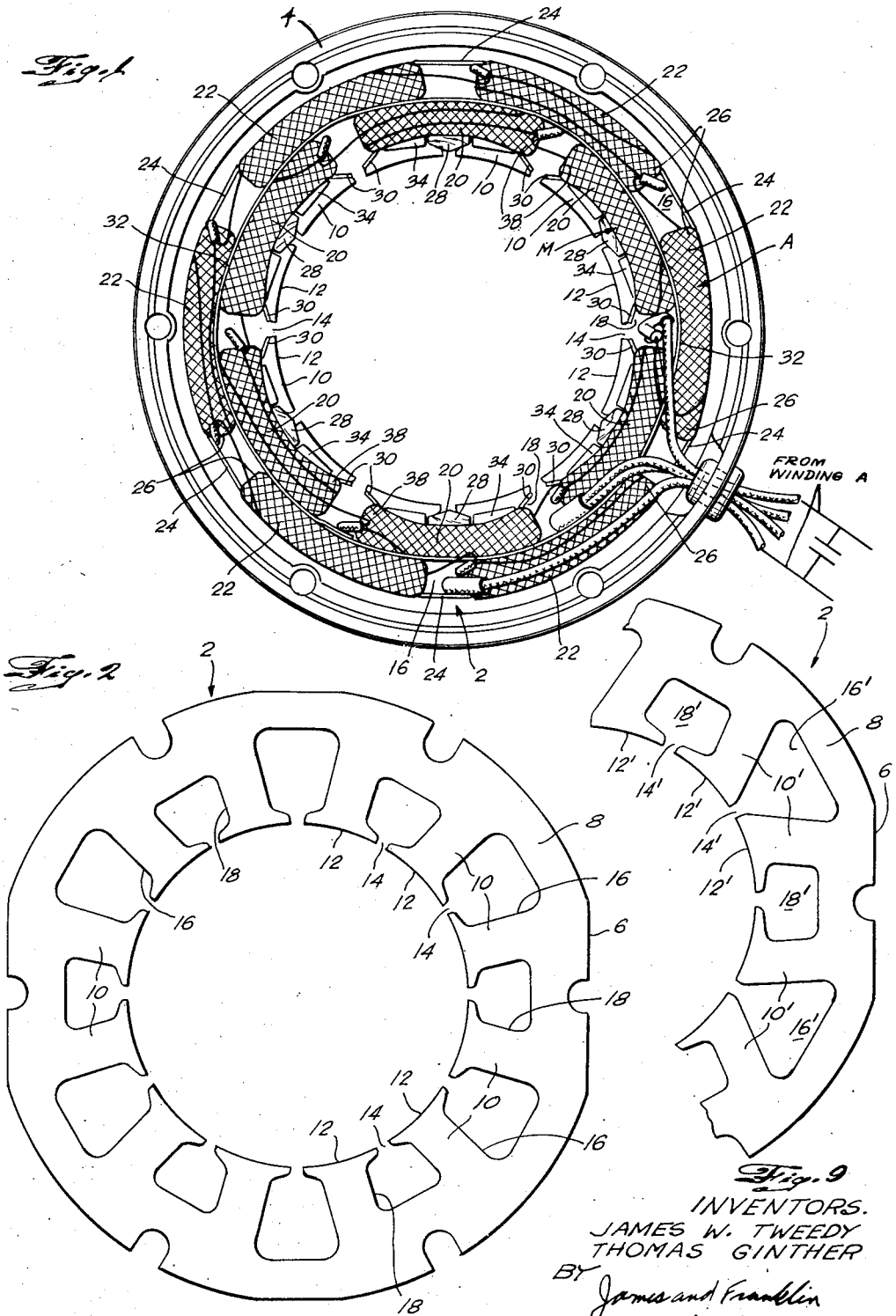

United States Patent Office 2,802,123
Patented Aug. 6, 1957

2,802,123

STATOR CONSTRUCTION FOR A CAPACITOR MOTOR OR THE LIKE

James W. Tweedy and Thomas Ginther, Owosso, Mich., assignors to Redmond Company, Inc., Owosso, Mich., a corporation of Michigan Application March 22, 1955, Serial No. 495,885

12 Claims. (Cl. 310—198)

The present invention relates to the construction of a capacitor motor or the like, and in particular to the manner in which the main and auxiliary windings are formed and wound on the stator.

There are various types of alternating current motors which utilize two sets of windings, each set usually being rotationally displaced from the other set, one of those windings being denominated the primary winding and the other the auxiliary winding. The auxiliary winding is often connected to a capacitor. The rotational displacement of the coils of the two sets of windings together with the phase displacement between the currents in those coils and the design of the magnetic circuit of the stator combine to produce a flux distribution in the stator which, when it reacts on the magnetizable rotor, gives rise to desirable operating characteristics. There are many types of motors which may be thus characterized, such as capacitor motors per se, single value capacitor motors, two value capacitor motors, permanent split phase motors, capacitor start motors, and others. These motors may be of single speed or multi-speed character, and may be designed to rotate in one direction or in opposite directions. The present invention is applicable to all such motors, as well as motors employing starting switches or relays.

In the past it has generally been thought desirable in motors of this type that at least one, and preferably both of the sets of windings be formed of a large number of individual coils, the number of the coils being some multiple of the number of poles which the machine is to have. For example, in a six-pole machine each winding may be composed of eighteen different electrically connected coils, or a total of thirty-six coils altogether, and the stator is provided with a large number of slots, usually less than seventy-two but always more than twelve, into which the ends of those coils are received. The individual coils of a given winding are rotationally staggered with respect to one another, in order to produce what is known as a distributed winding. This type of winding, which is employed in most commercial motors of this type today, presents appreciable manufacturing and economic problems, particularly insofar as the winding of the coils is concerned, since it is necessary that each of the individual coils must be separately wound and then manually inserted into the appropriate winding slots on the stator. Since each slot will contain parts of several coils, not all of which are part of the same winding, the problems of effectively insulating the windings from one another and properly electrically interconnecting the coils of a given winding are appreciable. Despite these and other drawbacks the distributed winding has been generally adopted because it has been felt that this arrangement is the only one which produces satisfactory flux distribution in the stator.

We have found that this complicated and expensive prior art arrangement is not at all necessary. We have produced, and here disclose, a motor in which each of the windings is composed of the same number of individual coils as there are operative poles in the machine. The coils may be wound on the stator in conventional manner, through the use of conventional automatic winding equipment. The design of the stator and the arrangement of the coils facilitates the attainment of proper insulation between the coils. The reduced number of coils makes proper electrical interconnection of the coils simple and well adapted to quantity production methods. The construction of the magnetizable portion of the stator is greatly simplified, since in a motor $n$ poles only $2n$ slots need be provided, these slots facilitating the positioning of the individual coils of each of the winding sets. The poles defined by the coils of the main windings are of substantially the same peripheral extent as the poles defined by the coils of the auxiliary winding and the poles of each winding overlap and are properly rotationally staggered with respect to the poles of the other winding. Despite these constructional and electrical simplifications, which might at first glance be thought to reduce cost at the expense of performance, motors constructed according to the present invention operate in a manner equal to or surpassing the performance of motors of conventional construction which utilize distributed windings.

In accordance with the present invention, for a motor having $n$ poles the stator laminations are provided with $2n$ radial slots, and preferably each alternate slot extends radially outwardly a greater distance than the inbetween slots, pole pieces being defined between the slots. The main winding is composed of $n$ coils and the auxiliary winding is composed of $n$ coils. The coils of one of these windings, for example, the auxiliary winding, are wound between alternate slots, and preferably the radially deeper slots, the coils being wound in those portions of said slots which are relatively radially outwardly disposed. As a result each slot will contain the ends of two such coils, the bodies of those coils extending in opposite directions from that particular slot to the next of the deeper slots along the exposed ends of the stator. Thus the auxiliary winding will produce $n$ concentrated auxiliary poles, each defined by two radially inwardly projecting pole pieces, those pole pieces being separated, at least at their radial inner parts, by the alternate, and preferably less radially deep, slots. The coils of the other set of windings, the main windings, for example, are then wound in the same manner in the alternate and preferably less radially deep slots, each of these latter slots containing the ends of two adjacent coils of the main winding, the bodies of those coils extending in opposite directions from said slot to the next adjacent slots of the same type along the exposed ends of the stator, thus spanning the radially inner portions of the first mentioned slots in which the ends of the coils of the auxiliary windings are positioned. Thus the coils of the main winding will define $n$ poles each comprising a pair of radially inwardly projecting pole pieces separated by one of the slots in which the coils of the auxiliary winding are wound. Each pole piece thus serves a double function, constituting a portion of a pole for the main winding and a portion of a pole for the auxiliary winding. The coils of the main winding and the coils of the auxiliary winding will be uniformly staggered, and preferably the coils of one of the windings will be on a circle radially outwardly disposed from the circle along which the coils of the other of the windings extend. Since access to each of the slots may be readily had through gaps between the individual pole pieces, as is conventional, it will be apparent that each of the coils may be wound by automatic winding equipment. The coils in the radially deeper of the slots are wound first, and those coils themselves, preferably in conjunction with a strip of insulation added thereto, serve to position the coils wound in the slots of less radial depth.

Because of the uniformity of the arrangement and the design of the stator itself, and particularly the laminations thereof, the construction in question permits the manufacture of a capacitor or similar type motor in a very inexpensive manner, which motor will have a performance which is eminently satisfactory and which equals or surpasses the performance of the motors of comparable but more conventional and more expensive construction.

To the accomplishment of the above, and to such other objects as may hereinafter appear, the present invention relates to the construction of the stator of a capacitor motor or the like, as defined in the appended claims and as described in this specification, taken together with the accompanying drawings, in which:

Fig. 1 is an end elevational view of a stator made according to the present invention and with the windings in place;

Fig. 2 is an end elevational view of one of the laminations of which that stator may be formed;

Fig. 3 is a fragmentary view of a stator lamination with a slot insulator in place in the radially deeper slots;

Fig. 4 is a view similar to Fig. 3 and showing coils of the auxiliary winding in place;

Fig. 5 is a view similar to Fig. 4 and showing wedges in place;

Fig. 6 is a view similar to Fig. 5 and showing the slot insulators in place in the less radially deep slots;

Fig. 7 is a view similar to Fig. 6 and showing the winding insulating strip in place;

Fig. 8 is a view similar to Fig. 7 and showing coils of the main winding in place; and Fig. 9 is a fragmentary view of a lamination having a somewhat different design from that of Figs. 2–8.

The stator comprises a plurality of laminations generally designated 2, these laminations being formed of some appropriate magnetizable material and being stacked to produce a structure of appropriate axial depth, the stacked laminations being held together in any appropriate manner, as by the use of an external die cast aluminum ring 4, the laminations 2 being provided with flats 6 along at least two edges thereof so as to prevent them from rotating, and thus shifting position, within the ring 4 which is cast therearound. The flats 6 also facilitate manufacture of the laminations 2 from a long strip of magnetizable material by reducing the amount of scrap involved.

The laminations 2 comprise an outer ring 8 of magnetizable material from which pole pieces 10 project radially inwardly, those pole pieces terminating in circumferentially enlarged pole faces 12 separated by gaps 14, all as is relatively conventional. In the stator of the present invention, however, the slots formed between the inwardly projecting pole pieces 10 are somewhat differently configured than is conventional. Each alternate slot 16 extends radially farther outwardly than the slots 18 therebetween and with which they alternate. Moreover, in a motor having $n$ operative poles, only $2n$ slots 16 and 18 are provided. In the embodiment here specifically illustrated a six-pole motor is disclosed and consequently there are twelve slots, six slots 16 and six slots 18 alternating with one another.

The motor is provided with a pair of windings, a main winding generally designated M and defined by $n$ individual coils 20 and an auxiliary winding generally designated A and defined by $n$ individual coils 22. In the six-pole machine here specifically disclosed, there are six coils 20 in the main winding M and six coils 22 in the auxiliary winding A.

The manner in which the coils 20 and 22 of the main and auxiliary windings M and A respectively are wound on the stator 2 and are appropriately insulated from the stator and from one another and may best be seen by an examination of Figs. 3–8. In those figures, for purposes of simplicity, the individual laminations 2 are disclosed without the die cast ring 4 therearound, but it will be understood that when the various operations disclosed in Figs. 3–8 are carried out, a unitary mechanical structure composed of the stacked laminations 2 held in place by the die cast ring 4 will be involved.

The first step, disclosed in Fig. 3, is to line the radially deeper slots 16 with an insulating strip 24 formed of appropriately treated insulating paper or other suitable material. The lined slots 16 are then in condition to have the individual coils 22 of the auxiliary winding A wound therein (see Fig. 4), each slot 16 receiving the ends 26 of two adjacent coils 22, the bodies of those coils extending over the laminations 2 to the next adjacent deeper slot 16, thus skipping the intermediate, and preferably less radially deep, slot 18. From Fig. 4 it will be apparent that the coils 22 of the auxiliary winding A are equally circumferentially spaced around the stator and that each produces a magnetic pole. The pole defined by the coil 22 completely shown in Fig. 4 is formed by the pole pieces 10b and 10c. The pole defined by the coil 22 shown fragmentarily at the top of Fig. 4 is defined by the pole piece 10a and the pole piece next adjacent thereto but not shown in the drawing. The pole defined by the coil 22 at the bottom of Fig. 4 is formed of the pole piece 10d and the pole piece next adjacent thereto but not shown in the drawing. Thus the coils 22 of the auxiliary winding A will, in the embodiment here disclosed, form six equally circumferentially spaced poles, each pole being formed from a pair of inwardly projecting pole pieces 10, those pole pieces being interrupted along a portion of their length by the slots 18.

Next, as illustrated in Fig. 5, individual non-magnetic wedges 28 are inserted in the slots 16 adjacent the gaps 14 between the pole faces 12, the wedges 28 being held in place between the tips of the slot insulator 24 and the tips of the pole pieces 10. The wedges 28 extend axially beyond the ends of the stack of laminations 2 in order to facilitate the winding of the coils 20 of the main winding M.

Next, as shown in Fig. 6, the slots 18 are lined with insulating strips 30 formed of the same or similar material as the slot insulating strips 24 for the slots 16.

After this, as shown in Fig. 7, a winding insulator strip is put in place. This strip, formed of appropriate insulating material, comprises a vertically extending body portion 32 which rests against the radially inner surfaces of the coils 22 of the auxiliary winding A, and flaps 34 which extend horizontally from the lower ends of the strip 32 so as to rest upon the exposed end surfaces of the corresponding pole pieces 10 and bridge or span the radially inner portions of the slots 16. The flaps 34 may be provided with short tabs 36 adapted to bend up partially along the inner surface of the wedges 28.

Thereafter the coils 20 of the main winding M are wound on the stator, the ends 38 of those coils being received within the lined slots 18 and the bodies of those coils extending over the flaps 34 of the winding insulator strip to the next adjacent slot 18, thus spanning or skipping the slot 16.

From the above it will be appreciated that each of the magnetic coils 20 of the main winding M define individual magnetic poles, here shown as six in number, since six coils 20 are employed, the pole of the uppermost coil 20 in Fig. 8 being defined by pole pieces 10a and 10b, and the pole of the lowermost coil 20 in Fig. 8 being defined by the pole pieces 10c and 10d.

Since each of the slots 16 and 18 opens onto the inner periphery of the pole faces 12 via a gap 14, it will be appreciated that each of the coils 20 and 22 may be wound on the stator laminations in conventional manner through the use of conventional automatic winding machines. Because the sides of the slots 16 are radial, the coils 22 will tend to be wound in the radially outer corners of the slots 16, the coils 22 thus disposing themselves around a circle comparatively remote from the center or axis of the stator. The coils 20 are wound so as to extend around a circle which is closer to the center or axis of the stator, both because the slots 18 are less radially deep than the slots 16 and because the bodies of coils 22 themselves define a radially outer limit to the positions which the turns of the coils 20 may assume. The insulating strip 32 effectively insulates the coils 20 from the coils 22 and prevents any undesired contact therebetween. The axially projecting portions of the wedges 28 insures that the inner surface of the windings of the coils 20 will not extend radially inwardly beyond the pole faces 12. The flaps 34 on the insulating winding strip effectively insulate the turns of the coils 20 from the laminations and also ensure that, during the winding operation, no slack portions thereof might fall into the slots 16 which they span. Since only twelve coils in all are involved, six for each winding, electrical interconnection between the coils of a given winding is greatly simplified when compared with distributed windings, thus speeding up production, reducing the possibility of human error and hence of rejects, and rendering the finished construction much more reliable in operation.

Each of the pole pieces 10 is identical, and each carries a portion of the flux from a winding 20 and a portion of the flux from a winding 22. Each pair of adjacent pole pieces 10 carries different fluxes relative to one another, however. The pole piece 10a and the pole piece 10b together carry all of the flux from the winding 20 but the pole piece 10a carries some of the flux from the coil 22 shown uppermost in Fig. 4 while the pole piece 10b carries some of the flux from the coil 22 shown in full in Fig. 4. The poles defined by the coils 20 of the main winding M are staggered with respect to the poles carrying the flux from the poles 22 in the auxiliary winding A, the fluxes from the coils of the respective windings overlap, and as a result an extremely effective flux distribution is produced, by reason of which the operating characteristics of the motor of the present invention are equal to or exceed those of conventional constructions having distributed windings, but with a great saving in cost and in ease of manufacture.

In Fig. 9 an alternate stator lamination design is disclosed. The slots 18' are substantially identical with the slots 18 in the embodiment of Figs. 2—8, but the slots 16' in Fig. 9 differ from the slots 16 in Figs. 2—8 primarily in that their side walls diverge outwardly from a radial direction. Moreover, the pole faces 12' in the laminations of Fig. 9 are not identical with one another as are the pole faces 12 in the embodiment of Figs. 2—8. In the embodiment of Figs. 2—8 the pole faces 12 extend circumferentially equally to either side of the pole pieces 10. In Fig. 9, however, the pole faces 12 of adjacent pole pieces 10 extend only in one direction and in opposite directions from one another. The construction shown in Fig. 9 produces a somewhat different flux distribution than the construction shown in Figs. 2—8, and the outward divergence of the side walls of the slots 18' produce sharper corners at the radially deeper portions of the slots 18', thus better ensuring that the coils 22 will be wound only in the radially outer portions of the slots 18'.

Purely by way of exemplification, we have constructed a one-twelfth horsepower 1060 R. P. M. induction motor according to the teachings of the present invention, the motor being rated at 1.21 watts and 1.2 amperes, by forming the main winding M from six coils 20, each coil having 125 turns of No. 25 wire, the auxiliary winding A being formed of six coils 22, each coil having 260 turns of No. 27 wire, the coils 22 of the auxiliary winding A being connected to a 5 mfd. 330 volt capacitor.

By the present construction as here disclosed a capacitor motor, or similar motor having main and auxiliary windings, has been produced in which distributed windings need not be employed in order to obtain satisfactory performance. The construction is simple, sturdy and easily manufactured, the coils are readily wound through the use of conventional equipment, and the coils are appropriately and effectively insulated from the laminations 2 and from each other.

While but a limited number of embodiments of the present invention have been here disclosed, it will be apparent that many variations may be made in the specific details thereof, all within the spirit of the invention as defined in the following claims.

We claim:

1. In the stator of claim 6, an insulating strip between those parts of the coils in each winding which extend axially beyond said ring, said insulating strip having flaps extending between those parts of said radially inner coils which extend axially beyond said ring and the axial end surfaces of the pole pieces covered by said coil parts.

2. A stator for a capacitor motor having $n$ magnetic poles and comprising a magnetizable ring having $2n$ pole pieces projecting radially inwardly therefrom and separated by slots, a main winding comprising $n$ electrically connected, and an auxiliary winding comprising $n$ electrically connected coils, each coil being wound to be contained in alternate slots and each slot receiving only coils from a given winding, the coils of one of said windings being positioned along a circle radially inwardly spaced from the circle along which the coils of the other winding extend and parts of said coils of said one winding which extend axially beyond said ring spanning the radially inner portions of the slots in which the coils of the other windings are wound, and wedges only in said last mentioned slots between said coil parts and the mouths of said slots.

3. A stator for a capacitor motor having $n$ magnetic poles and comprising a magnetizable ring having $2n$ pole pieces projecting radially inwardly therefrom and separated by slots, a main winding comprising $n$ electrically connected coils, and an auxiliary winding comprising $n$ electrically connected coils, each coil being wound to be contained in alternate slots and each slot receiving only coils from a given winding, the coils of one of said windings being positioned along a circle radially inwardly spaced from the circle along which the coils of the other winding extend, and an insulating strip between those parts of the coils in each winding which extend axially beyond said ring, said strip having flaps extending between the axially end surfaces of appropriate pole pieces and those parts of said radially inner coils which extend over said surfaces.

4. A stator for a capacitor motor having $n$ magnetic poles and comprising a magnetizable ring having $2n$ pole pieces projecting radially inwardly therefrom and separated by slots, a main winding comprising $n$ electrically connected coils, and an auxiliary winding comprising $n$ electrically connected coils, each coil being wound to be contained in alternate slots and each slot receiving only coils from a given winding, the coils of one of said windings being positioned along a circle radially inwardly spaced from the circle along which the coils of the other winding extend and parts of said coils of said one winding which extend axially beyond said ring spanning the radially inner portions of the slots in which the coils of the other winding are wound, and an insulating strip between those parts of the coils in each winding which extend axially beyond said ring, said strip having flaps extending between those parts of said radial inner coils which extend axially beyond said ring and over the axially end surfaces of the pole pieces and the axial ends of the slots covered by said coil parts.

5. A stator for a capacitor motor having $n$ magnetic poles and comprising a magnetizable ring having $2n$ pole pieces projecting radially inwardly therefrom and separated by slots, a main winding comprising $n$ electrically connected coils, and an auxiliary winding comprising $n$ electrically connected coils, each coil being wound to be contained in alternate slots and each slot receiving only coils from a given winding, the coils of one of said windings being positioned along a circle radially inwardly spaced from the circle along which the coils of the other winding extend and parts of said coils of said one winding which extend axially beyond said ring spanning the radially inner portions of the slots in which the coils of the other winding are wound, wedges in said last mentioned slots between said coil parts and the mouths of said slots, and an insulating strip between those parts of the coils in each winding which extend axially beyond said ring and over the axially end surfaces of the pole pieces and the axial ends of the spanned slots covered by said coil parts.

6. A stator for a capacitor motor having $n$ magnetic poles and comprising a magnetizable ring having $2n$ pole pieces projecting radially inwardly therefrom and separated by slots, a main winding comprising $n$ electrically connected coils, and an auxiliary winding comprising $n$ electrically connected coils, each coil being wound to be contained in alternate slots and each slot receiving only coils from a given winding, a first set of slots which receive the coils of a given winding being deeper than the second set of slots which receive the coils of the other winding, the coils of said given winding being wound in the deeper parts of said first set of slots, the coils of the other winding being positioned radially inwardly from the coils of said given winding, and parts of said coils of said other winding which extend axially beyond said ring spanning the radially inner portions of said first set of slots, said given winding being connected to a phase displacing means, and wedges only in said first set of slots between said coil parts and the mouths of said slots.

7. A stator for a capacitor motor having $n$ magnetic poles and comprising a magnetizable ring having $2n$ pole pieces projecting radially inwardly therefrom and separated by slots, a main winding comprising $n$ electrically connected coils, each coil being wound to be contained in alternate slots and each slot receiving only coils from a given winding, a first set of slots which receive the coils of a given winding being deeper than the second set of slots which receive the coils of the other winding, the coils of said given winding being wound in the deeper parts of said first set of slots, the coils of the other winding being positioned radially inwardly from the coils of said given winding, said given winding being connected to a phase displacing means, and an insulating strip between those parts of the coils of each winding which extend axially beyond said ring, said strip having flaps extending between those parts of said radially inner coils which extend axially beyond said ring and the axially end surfaces of the pole pieces covered thereby.

8. A stator for a capacitor motor having $n$ magnetic poles and comprising a magnetizable ring having $2n$ pole pieces projecting radially inwardly therefrom and separated by slots, a main winding comprising $n$ electrically connected coils, and an auxiliary winding comprising $n$ electrically connected coils, each coil being wound to be contained in alternate slots and each slot receiving only coils from a given winding, a first set of slots which receive the coils of a given winding being deeper than the second set of slots which receive the coils of the other winding, the coils of said given winding being wound in the deeper parts of said first set of slots, the coils of the other winding being positioned radially inwardly from the coils of said given winding, and parts of said coils of said other winding which extend axially beyond said ring spanning the radially inner portions of said first set of slots, said given winding being connected to a phase displacing means, and an insulating strip between those parts of the coils of each winding which extend axially beyond said ring, said strip having flaps extending between those parts of said radially inner coils which extend axially beyond said ring and the axially end surfaces of the pole pieces covered thereby.

9. A stator comprising a magnetizable ring having a plurality of pole pieces projecting radially inwardly therefrom and separated by slots, a main winding and an auxiliary winding each comprising a plurality of electrically connected coils, some of said coils being positioned along a circle radially inwardly spaced from the circle along which others of said coils extend and being received in non-adjacent slots, parts of said coils which extend axially beyond said ring spanning the radially inner portions of the slots between said non-adjacent slots, and wedges only in said spanned slots between said coil parts and the mouths of said spanned slots.

10. A stator comprising a magnetizable ring having a plurality of pole pieces projecting radially inwardly therefrom and separated by slots, a main winding, and an auxiliary winding each comprising a plurality of electrically connected coils, some of said coils being positioned along a circle radially inwardly spaced from the circle along which others of said coils extend and being received in non-adjacent slots, and an insulating strip between those parts of said coils in each winding which extend axially beyond said ring, said strip having flaps extending between the axially end surfaces of appropriate pole pieces and those parts of said radially inner coils which extend over said surfaces.

11. A stator comprising a magnetizable ring having a plurality of pole pieces projecting radially inwardly therefrom and separated by slots, a main winding and an auxiliary winding each comprising a plurality of electrically connected coils, some of said coils being positioned along a circle radially inwardly spaced from the circle along which others of said coils extend and being received in non-adjacent slots, parts of said coils which extend axially beyond said ring spanning the radially inner portions of the slots between said non-adjacent slots, and an insulating strip between those parts of said coils in each winding which extend axially beyond said ring, said strip having flaps extending between those parts of said radially inner coils which extend axially beyond said ring and over the axially end surfaces of the pole pieces and the axial ends of the slots spanned by said coil parts.

12. A stator comprising a magnetizable ring having a plurality of pole pieces projecting radially inwardly therefrom and separated by slots, a main winding and an auxiliary winding each comprising a plurality of electrically connected coils, some of said coils being positioned along a circle radially inwardly spaced from the circle along which others of said coils extend and being received in non-adjacent slots, parts of said coils which extend axially beyond said ring spanning the radially inner portions of the slots between said non-adjacent slots, wedges in said spanned slots between said coil parts and the mouths of said spanned slots, and an insulating strip between those parts of said coils in each winding which extend axially beyond said ring, said strip having flaps extending between those parts of said radially inner coils which extend axially beyond said ring and over the axially end surfaces of the pole pieces and the axial ends of the slots spanned by said coil parts.

References Cited in the file of this patent

UNITED STATES PATENTS

| | | |
|---|---|---|
| 732,822 | Bradley | July 7, 1903 |
| 1,580,682 | Sandell | Apr. 13, 1926 |
| 2,041,875 | Stroller | May 26, 1936 |
| 2,485,628 | Morrill | Oct. 25, 1949 |
| 2,502,068 | Anderson | Mar. 28, 1950 |
| 2,615,944 | Carlson | Oct. 28, 1952 |
| 2,761,082 | Chang | Aug. 28, 1956 |

FOREIGN PATENTS

| | | |
|---|---|---|
| 512,158 | France | Oct. 7, 1920 |
| 444,712 | Italy | Jan. 28, 1949 |